Figure 1:
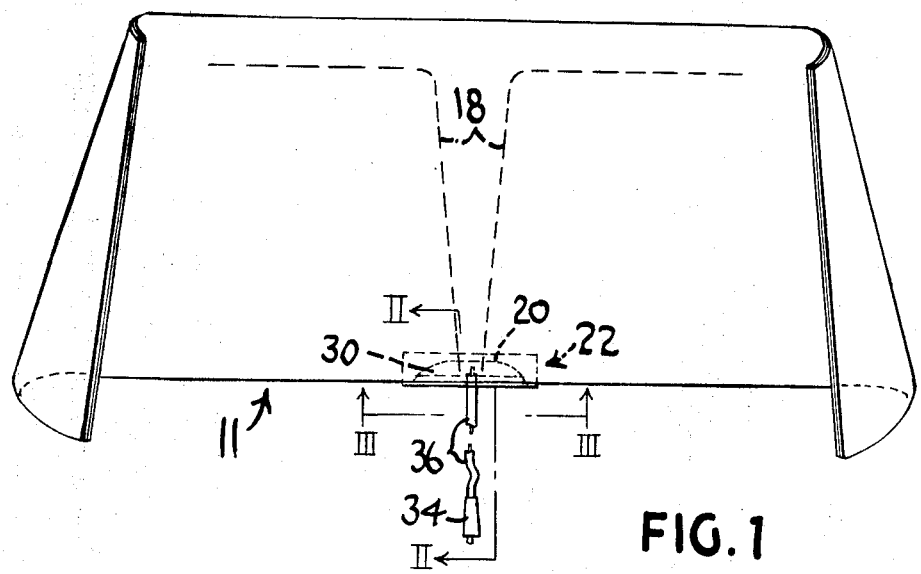

United States Patent

[11] 3,549,785

| [72] | Inventors | Albert J. Timko, Jr.;<br>Paul E. Shaffer, Pittsburgh, Pa. |
|---|---|---|
| [21] | Appl. No. | 726,337 |
| [22] | Filed | May 3, 1968 |
| [45] | Patented | Dec. 22, 1970 |
| [73] | Assignee | PPG Industries, Inc.<br>Pittsburgh, Pa.<br>a corporation of Pennsylvania |

[54] LAMINATED STRUCTURE
8 Claims, 3 Drawing Figs.

[52] U.S. Cl. .................................................. 174/68.5,
161/44, 219/203, 219/522, 343/712
[51] Int. Cl. .......................................................... H01q 1/32,
H05k 1/00

[50] Field of Search............................................ 174/68.5;
219/203, 522; 338/307—309, 312; 343/711—713,
720; 161/44

[56] References Cited
UNITED STATES PATENTS

| 3,041,436 | 6/1962 | Brady | 219/203 |
| 3,208,070 | 9/1965 | Boicey | 343/712 |

Primary Examiner—Darrell L. Clay
Attorney—Chisholm and Spencer

ABSTRACT: A laminated glass-plastic windshield having a notched portion along the margin of one of its glass sheets and antenna wire embedded within the windshield connected to a lead-in wire in said notched portion. An angle member of moisture-impervious material encompasses the notched portion to form an enclosed chamber that is completely filled with a filler of moisture-resistant, electrically insulating material.

PATENTED DEC22 1970

3,549,785

INVENTORS
ALBERT J. TIMKO, JR
PAUL E. SHAFFER

BY
ATTORNEYS

LAMINATED STRUCTURE

BACKGROUND OF THE INVENTION

This invention covers a laminated structure, and particularly relates to a laminated glass-plastic windshield for an automobile and its method of fabrication.

Laminated windshields having a pair of glass sheets of matched curvature and a thermoplastic interlayer supporting electroconductive wire to be used as an antenna for a radio of an automobile in which the windshield is installed are known. U.S. Pat. No. 3,208,070 to Boicey and British Pat. 647,665 to Beck et al. disclose the general idea of wire embedded in a laminated windshield for use as an antenna. In addition, application Ser. No. 551,708 of Hugh E. Shaw, Jr., filed Dec. 6, 1965, now Pat. No. 3,367,221, discloses a windshield antenna of this type that has superior receiving characteristics in an automobile facing any direction of the compass compared to the characteristics of the windshields described in the previous references cited.

Prior to the present invention, such antenna windshields were subject to problems involving undue exposure of the interlayer to atmospheric moisture in the vicinity of the electrical connection between the antenna wire embedded in the windshield and the lead-in wire connected to the radio of the vehicle. After a relatively short period of accelerated testing, the plastic interlayer of such antenna windshields tended to delaminate from the glass. This delamination was attributed to moisture penetration into the interlayer.

The wire antenna of prior art windshields were connected to the lead wire outside the windshield. Hence, the exposed portion of the fragile antenna wire was susceptible to frequent breakage requiring repair. The present invention provides a simple, yet effective, method of connecting a lead-in wire for an automobile radio to an antenna wire disposed within the automobile windshield that protects the critical portion of the interlayer from moisture and is sufficiently strong to withstand a pull of 25 pounds.

Any exposed antenna wire and the exposed end of the lead-in wire and the means connecting the antenna wire and the lead-in wire are encased in a chamber having walls of moisture-resistant material to reduce penetration of moisture into the interlayer. A filler of electrical insulator material effectively insulates the antenna wire, the lead-in wire and the connection therebetween from interference resulting from contact with the metal of the automobile body in which the windshield is installed.

ILLUSTRATIVE EMBODIMENT OF THE INVENTION

The present invention will be understood more clearly after one reads a description of an illustrative embodiment of the present invention that follows.

Figure 2:
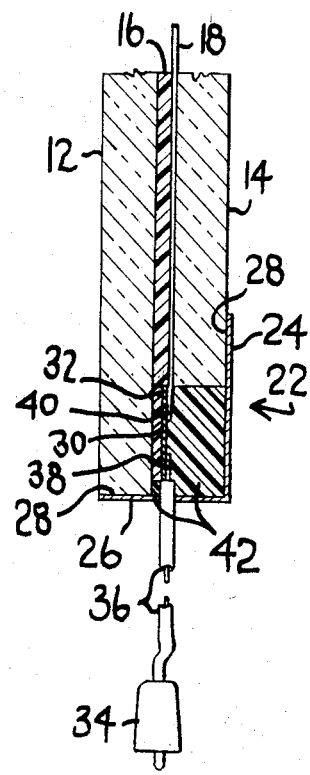
Figure 3:
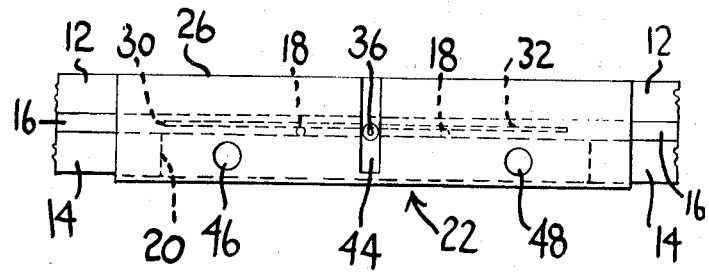

In the drawings that form part of the aforesaid description, wherein like reference numerals refer to like structural elements, FIG. 1 is an inner view of an antenna windshield provided with a suitable interior connection to a lead wire in accordance with the present invention;

FIG. 2 is an enlarged cross-sectional view of a portion of the windshield taken along the lines II–II of FIG. 1; and FIG. 3 is a fragmentary enlarged end view of the windshield of FIG. 1 taken along the lines III–III.

In the drawings, a laminated windshield is shown generally by reference number 11 as comprising an inner glass sheet 12, an outer glass sheet 14 and a thermoplastic interlayer 16 of a material subject to moisture deterioration such as plasticized polyvinyl butyral bonded between the outer and inner glass sheets. Electroconductive wire 18 having the configuration of a pair of diverging wires is embedded within the surface of the plastic interlayer 16, as shown in FIG. 1.

The glass sheets 12 and 14 and the interlayer 16 have matched curvatures and substantially identical outlines except for a notched portion 20 along the margin of the outer glass sheet 14. The notched portion has an arcuate inner boundary.

An angle member 22 of moisture-impervious material, such as a thin bent sheet of aluminum, forms a solid wall 24 and an apertured, slotted wall 26 disposed at an angle to the solid wall 24. A layer of pressure sensitive adhesive 28 is located on the inner surfaces forming the inner angle between said walls 24 and 26. The angle member 22 is slightly longer than the notched portion 20 with solid wall 24 slightly higher than the maximum width of the notched out portion and apertured slotted wall 26 having a width substantially equal to the thickness of the laminated windshield 11.

The angle member 22 is adhered by pressure to the outer glass sheet 14 with wall 26 adhered to the edge surfaces of both glass sheets 12 and 14 and wall 24 adhered to the exposed surface of the outer glass sheet 14. The adhered angle member 22 is located over the notched portion 20, thereby cooperating with the inner sheet 12 to convert the notched portion 20 into an enclosed chamber.

A metal tab 30 having an adhesive 32 on its surface facing the inner surface of the inner glass sheet 12 is adhered by pressure against the portion of interlayer 16 that faces the notched portion 20. The inner edge surface of the tab conforms to the shape of the inner surface of the notched portion 20 so that the conforming surfaces of the tab 30 and the notched portion 20 abut. The tab 30 has a width slightly less than that of the notched portion so that its outer edge is recessed within the outer edge surface of the inner glass sheet 12 forming a wall of the chamber defined by the notched portion 20.

A plug 34 to be inserted into a radio has a lead-in wire 36 extending therefrom into the chamber formed by the notched out portion 20. The lead-in wire 36 is encased with insulation except for its free end 38. The uninsulated free end 38 is soldered to the metal tab 30. Similarly, the electroconductive wire 18 has a free end 40 that is soldered to the metal tab 30. Therefore, the metal tab 30 serves as means to connect the lead-in wire 36 to the antenna wire 18.

The chamber defined by the notched portion 20 is filled with a filler 42 of moisture-resistant, electrically insulating material. This may be a preformed member of an insulation material such as a fiber glass reinforced resin coated with a pressure sensitive adhesive, for example. However, such a preformed member must conform exactly in shape to that of the notched portion 20 containing the metal tab 30. The technique to be described immediately below has been found to be more suitable for insulating the exposed wires and their connecting means from electrical contact with the metal frame during a test simulating mass production.

The apertured slotted wall 26 is provided with a centrally disposed slot 44 of just sufficient width to provide clearance to enable the angle member 22 to fit over the lead-in wire 36 when the angle member is applied against the lower central portion of the windshield to encompass the notched out portion 20 of the outer glass sheet 14. In addition, apertures 46 and 48 are provided in the apertured-slotted wall 26. One of the apertures is used for injection molding a rapidly setting resin of electrical insulation material, while the other aperture and the slot 44 permit air to escape from the chamber when the resin is injected.

The article described above is made in the following manner. A pair of glass sheets 12 and 14 are mounted in superimposed relation with a suitable parting material disposed between the sheets. Sheet 14 having the notched out portion 20 is disposed below sheet 12. The two glass sheets are preferably made of plate glass or float glass of commercial soda-lime-silica composition. The two sheets are superimposed in the manner recited in bending relation to a glass bending mold having an upward facing outline shaping surface of concave contour in elevation. The glass laden mold is exposed to sufficient heat to cause the glass sheets to conform to the upward facing shaping surface of the bending mold.

After the sheets have bent to the desired curvature and cooled according to a controlled pattern of cooling, they are removed from the bending mold and are assembled to form a sandwich with a sheet of plasticized polyvinyl butyral having the antenna wire embedded therein with excess wire extending from the plastic. The wire is embedded in the plastic sheet 16 by a hot needle. A typical technique for sewing a thin wire into a sheet of insulating material such as the plastic interlayer sheet 16, is shown in U.S. Pat. No. 2,813,960 to Egle and Bethge.

After the glass-plastic sandwich has been assembled, the assembly is subjected to a commercial laminating operation. A suitable operation is described and claimed in U.S. Pat. No. 2,948,645 to Laurence A. Keim, assigned to PPG Industries, Inc.

After the assembly is laminated, it is cleaned with particular care being taken to remove oil from the notched portion of the assembly. The excess wire extending from the plastic sheet 16 is carefully removed from the chamber without disturbing the portion embedded in the interlayer 16. A metal tab 30, preferably copper or aluminum about 15 mils thick having a lead-in wire 36 already soldered to its uncoated surface and having its other surface coated with an adhesive, is adhered by pressure to the portion of the interlayer 16 that faces the notched portion 20. Pressure causes the plastic interlayer 16 to compress within the chamber and to exude beyond the outline of the windshield 11. Any interlayer material that exudes beyond the metal tab 30 is carefully trimmed, taking care to avoid damaging the antenna wire extension and the lead-in wire.

Suitable adhesives for the metal tab surface include plasticized polyvinyl butyral, and the following commercially available materials sold under the following trade names by the following corporations: Poly EM sold by Gulf Oil Corporation of Pittsburgh, Penna., Eastman 910 sold by Eastman Kodak Corporation of Rochester, N.Y., and Tackmaster 1477 sold by PPG Industries, Inc. of Pittsburgh, Penna.

The metal tab 30 is inserted with its conforming inner edge abutting against the arcuate inner edge of the notched portion 20. The free ends 40 of the antenna wires 18 are then soldered to the metal tab 30 and any excess antenna wire removed by cutting. The windshield then is inspected for optical flaws.

The angle member 22 is then adhered by the pressure sensitive adhesive 28 (which is preferably the aforesaid Tackmaster 1477 ) to abut against the windshield 11 and completely cover the notched portion 20. In doing so, the slot 44 slides around the lead-in wire 36 to form the chamber defined by the notched portion 20.

The angle member 22 is preferably formed of any material that is moisture impervious. Thin aluminum sheeting has been found to be quite suitable. For a typical notched portion 2 inches long and about 0.3 inch wide at its widest portion, a partially tempered, flat aluminum sheet 3½ inches long and five-eighths inch wide is perforated to form the apertures 46 and 48 and the slot 44 and then bent along an axis extending lengthwise of the sheet to form a slotted apertured wall 26 having a width of ¼ inch and a solid wall 24 having a width of three-eighths inch. Other suitable materials are lead foil tape, copper sheeting, and the like.

After the windshield has passed its optical inspection and the angle member 22 has been secured to the windshield 11 to convert the notched portion 20 into an enclosed chamber, the antenna is then tested to determine the signal receiving ability. If the antenna passes this test, the filler 42 of electrical insulator material is injection molded through one of the apertures 46 or 48 of the angle member 22. A rapidly curing, water-resistant resin, such as a polysulfide resin called Thiokol sold by the Thiokol Chemical Corporation, Bristol, Penna., or a room temperature vulcanizable silicone, such as 615 RTV silicone supplied by General Electric Company, Schenectady, N.Y., or Scotchcast 225 electrical resin sold by Minnesota Mining and Manufacturing Company, St. Paul, Minn. Any filler material having the ability to set within 24 hours is termed a "rapid setting" material for the purposes of the present invention.

When excess resin flows out through the other aperture 48 and the centrally disposed slot 44, the chamber enclosed by the walls 24 and 26 of the angle member 22 is completely filled with resin. Any excess resin that is inserted in a chamber oriented with its aperture facing upward forms small mushroom-shaped domes that mechanically lock the angle member in place. The resin provides sufficient insulation to insulate the free end 40 of the antenna wire 18 and the uninsulated end 38 of the insulated lead-in wire 36 as well as the connecting means in the form of the metal tab 30 from any electric connection with the metal of the automobile body in which the windshield is to be installed.

The injection molding operation is preferably conducted after the laminated windshields have been mounted on a shipping pallet for shipping with the windshields oriented so that the chamber to be filled with resin faces upward. The materials suitable for the filler have a short pot life on the order of a few hours, subject to variation depending on the choice and quantity of accelerator used as explained in the literature of the suppliers of these materials. After 24 hours, these materials are sufficiently set so that the windshields can be transported without danger of the system losing its moisture-resistant characteristics. It is necessary that the racks be stored for sufficient time for the resin to set before the windshields in the pallet are installed. To be on the safe side, the rack containing a number of windshields is permitted to stand overnight after the injection molding operation takes place to insure that the resin is set before the rack of windshields is shipped.

In case the antenna is a dipole requiring two insulated lead-in wires and two insulated antenna wires forming two electrically insulated connections, a pair of metal tabs may be used, one for each connection.

The antenna wire of the embodiment recited above has been described as being embedded within the interlayer. The present invention is also suitable to attach any electroconductive means that is embedded on or within an interior glass surface to a lead-in wire, provided the connection is protected by a moisture-resistant, electrically insulating material.

Furthermore, while the invention has been described for use in laminated antenna windshields, the protected interior connection to an outside lead-in wire is equally adaptable for use in other electroconductive articles, such as coated glass used as resistance heaters, heated windows having defogging and/or deicing properties, such as aircraft, railroad car, truck and other windows, and the like.

The form of the invention shown and described in this disclosure represents an illustrative embodiment thereof. It is understood that various changes may be made without departing from the spirit of the invention as defined and claimed in the subject matter which follows.

We claim:

1. A laminated glass-plastic windshield comprising a pair of glass sheets of matching curvature, a plastic interlayer of a material subject to moisture deterioration bonded between said glass sheets, an electroconductive wire carried within said windshield, one of said glass sheets having a notched portion along its margin, said electroconductive wire having an end thereof extending into said notched portion, a lead-in wire having an end extending into said notched portion, means to connect said end of said lead-in wire to said end of said electroconductive wire, an two-walled angle member of moisture-impervious material encompassing said notched portion to form an enclosed chamber therewith, and a filler of a rapid setting, moisture-resistant, electrically insulating material filling said chamber.

2. A windshield as in claim 1, wherein said angle member has a wall facing an edge surface of said windshield, one of said two walls comprising a slot around said lead-in wire and an aperture for injection molding said rapid setting material into said chamber.

3. A windshield as in claim 2, wherein said apertured wall comprises another aperture remote from said first mentioned aperture to facilitate removing air from said chamber during the injection of said rapid setting material into said chamber through said first named aperture.

4. A windshield as in claim 1, wherein said means to connect said wire ends comprises a metal tab having a smaller dimension than said notched portion and being located in said chamber in recessed relation to the outer marginal edge of said recessed portion, solder connecting said end of said electroconductive wire to said metal tab and solder connecting said end of said lead-in wire to said metal tab.

5. A windshield as in claim 4, wherein said lead-in wire is encased in an insulating sleeve except for said end, and said filler is arranged to electrically insulate said end of electroconductive wire, said exposed end of said lead-in wire and said metal tab from a metal frame of a vehicle in which said windshield may be installed.

6. A method of producing a windshield as in claim 1, comprising:
  1. selecting a pair of glass sheets of matching contour;
  2. notching one of said pair of glass sheets along it marginal portion;
  3. bending said pair of glass sheets to matching curvature;
  4. sewing an electroconductive wire into a sheet of plastic interlayer material leaving an excess of said wire extending therefrom;
  5. laminating said bent glass sheets to said sheet of plastic interlayer material to form a glass-plastic laminated assembly having a notched portion along its margin;
  6. connecting a lead-in wire to a metal tab smaller than said notched portion;
  7. adhering said metal tab to said laminated assembly in said notched portion in recessed relation to said margin;
  8. connecting said wire extending from said sheet of plastic interlayer material to said metal tab;
  9. trimming any excess of said extending wire;
  10. enclosing said notched portion with an apertured member of moisture-impervious material having at least two apertures to form a chamber;
  11. orienting the assembly with said notched portion facing upward;
  12. injection molding a rapid setting resin of electrical insulator material into said notched portion through one of said apertures until said chamber is filled; and
  13. permitting said laminated assembly to stand in said orientation until said resin has set.

7. A windshield as in claim 1, wherein said two-walled angle member is composed of a flexible member.

8. A windshield as in claim 7, wherein said flexible metal is aluminum.